United States Patent Office 2,940,528
Patented June 14, 1960

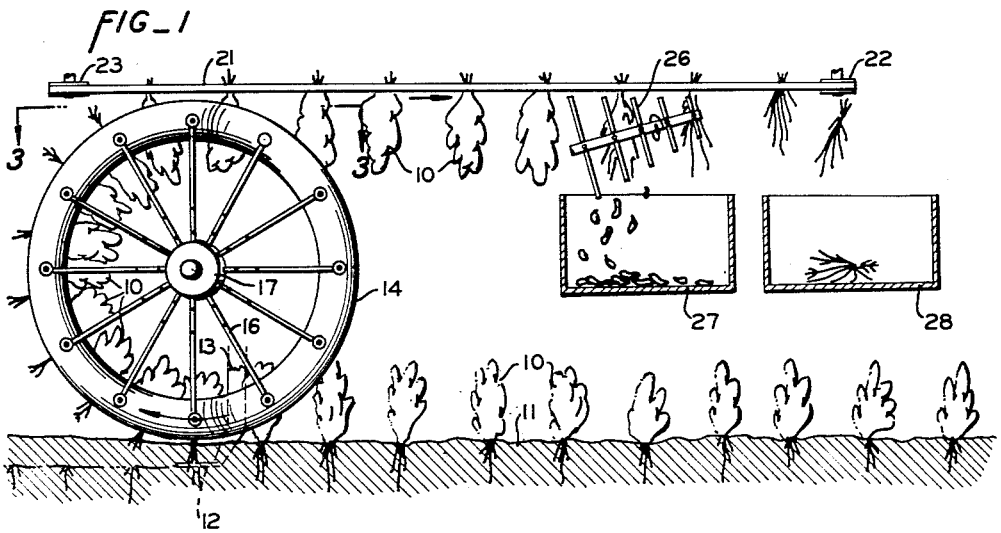
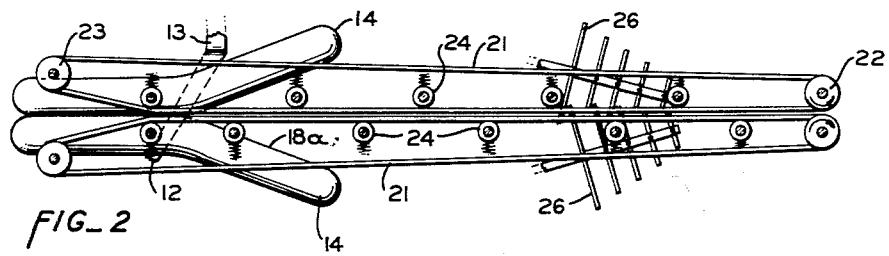
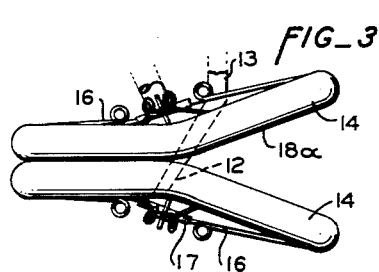
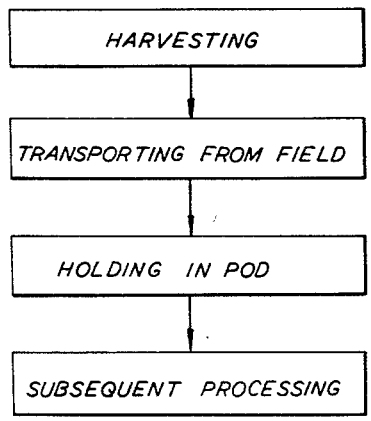

2,940,528

METHOD OF PACKING AND/OR HARVESTING FRUIT OR VEGETABLE ARTICLES FROM BUSH TYPE PLANTS

Roy M. Magnuson, Los Gatos, Calif., assignor, by direct and mesne assignments, of one-half to Santa Clara Frosted Foods Co., Santa Clara, Calif.; one-quarter to Genevieve I. Magnuson and one-quarter to Genevieve I. Magnuson, Robert Magnuson, and Lois J. Fox, as trustees Filed Jan. 16, 1956, Ser. No. 559,367

8 Claims. (Cl. 171—1)

The present invention relates to a process of packing and/or harvesting fruit and vegetable articles from bush type plants such as Fordhook Lima beans, for example, and is concerned more particularly with a process which will provide a more desirable product for the packing operation, and which will facilitate and improve the entire packing operation in connection with podded products such as Fordhook Lima beans, for example.

It is a general object of the invention to provide a method for harvesting crops of the above character with a gentle lifting and grasping action, which will not subject the crop articles to harmful beating action.

Another object of the invention is to provide an improved method incorporating an improved gentle lifting action for lifting the plants from the ground.

Another object of the invention is to provide an improved method whereby the vegetables are placed in an inverted position after being lifted from the ground, and in which the crop articles are removed progressively from the lowermost point of the plant upwardly.

Another general object of the invention is to provide an improved method of packing a container with crop articles, such as the products from pods, so that the products will be in relatively unharmed and clean condition, and so that they can be held in the plant while maintaining their freshness and flavor characteristics until the time of packing.

The above and other objects of the invention are attained in connection with a preferred method of carrying out the invention, as disclosed in the accompanying description and in the accompanying drawings, in which:

Figure 1 is a schematic view of apparatus designed to carry out the method of the instant invention.

Figure 2 is a schematic plan view of the apparatus.

Figure 3 is a schematic plan view of the pneumatic wheels for effecting the grasping, lifting and inverting operation on the plants.

Figure 4 is a flow diagram indicating generally a sequence of operations in accordance with the invention.

The present invention is described in connection with the harvesting and packing of Fordhook Lima beans as it would be carried out in a quick-freeze plant, the entire packing operation being equally applicable to other types of podded products, and the harvesting portion of the description being equally applicable to other bush-type plants that bear a plurality of crop articles thereon, such as tomatoes.

In accordance with the instant invention, the row of bush type plants 10 in the ground 11 are subjected to a root loosening and/or severing action by means of a blade 12 carried on a machine by an arm 13 of suitable construction, the character of the machine being unnecessary to an understanding of the instant invention. The loosening and severing knife 12 is positioned immediately below a pair of yieldable elements such as pneumatic grasping, lifting and inverting wheels 14, which are of a suitable type such as a pneumatic inner tube of the type used in truck tires. The tubes 14 may be carried by a plurality of flexible spokes 16 from a hub 17. The hubs 17 rotate about axes inclined to each other so that the normal path of rotation of the wheels would be represented by the front diverging portions 18a thereof, but by virtue of their lateral juxtaposition, these wheels 14 remain in contact through substantially 180 degrees of their travel to a point immediately above the ground. The wheels 14 are preferably operated so that their plant grasping portions are traveling at a peripheral speed substantially equal to the ground speed of the machine which carries them, but preferably out of contact with the ground.

These wheels 14 perform a gentle yet effective grasping action over an area of the plant and preferably engage the plant at a location slightly spaced from the stem-root juncture thereof and including a crop portion of the plant so as to place this stem-root juncture in exposed position at the top of the wheels after the plants have been inverted. Cooperating with the wheels 14, are a pair of gripping belts 21 of conventional rubber construction which may be carried by suitable driving and idler pulleys 22 and 23, and which are divergent at their rearward end to the left in Figure 2, adjacent the point of entry of the root portion of a plant, therebetween as they are being lifted by the wheels 14. Thereafter the rubber belts 21 are brought into close parallel relation by a series of spring-urged rollers 24. The belts 21 extend a considerable distance forward of the direction of travel of the wheels 14 as seen clearly in Figure 1. These gripping belts grip the plant while grasped by the wheels 14 spaced above the crop bearing portion of the plant, and as shown and disclosed herein, this gripping action takes place substantially at the root-stem juncture of the plant. These belts 21 travel in the same direction as the travel of the equipment, and therefore have a ground speed substantially equal to the tangential speed of the wheels 14 at the top, and approximately twice the ground speed of the equipment.

After the plants have been gripped by the gripping belts 21 and are firmly engaged therewith, they are carried past a pair of tapered beating reels 26, having their axes inclined to each other both in the horizontal and the vertical to place the outer end of the reel spokes or fingers at the upper portion of the travel substantially horizontal and to provide an upwardly-extending beating action on the plants as they enter between the reels. These reels 26 have their adjacent parts moving downwardly and serve to comb the plants and to strip the crop articles and leaves therefrom and to discharge these into a suitable hopper 27 disposed underneath. The stripped stem and root structures are carried past the hopper 27 to a suitable point of discharge indicated by a hopper 28.

It is to be noted that the tubes or wheels 14 are deformable to correspond to the shape of the plant being grasped, and are of a yieldable material so as to not injure the crop article such as the pods on a lima bean plant during the uprooting, lifting and inverting action. The crop articles therefore are removed and delivered in substantially undamaged condition to the crop receiving hopper 27.

This mixture of crop and leaves are subjected to a subsequent separating action such as an air blast which will lift the lighter leaves from the crop articles and leave the crop articles as the end result of the harvesting operation.

Where the crop articles being harvested and packed are a podded product such as Fordhook Lima beans, the crop articles resulting from the above operations are the pods containing the beans or other vegetables, so that these beans are still protected by the pod itself, and are in a clean, fresh condition.

Subsequently, the podded products are transported to the packing plant for subsequent processing, and while remaining in the pod may be held for a substantial period of time until required for the packing operation. This ability to hold the product in the pod, removes the requirement for extremely rapid processing such as is required after podding of the product. The product in the pod will retain its freshness over a substantial period until a convenient time for processing.

When the packing operation requires additional articles for packing, the pods are broken open in any suitable manner and this podding operation may be performed by any conventional podding step. Thereafter the articles fresh from the pods are processed as required, for example, blanched and quick frozen and packed for the market.

While I have shown and described a preferred method of carrying out the invention, it will be apparent that this method is capable of variation in its various steps and that therefore the scope of the invention should be limited only by the scope of the claims appended hereto.

I claim:

1. A process of harvesting fruit and vegetable crops which grow on a bush-type plant, which comprises loosening the plant roots, gently grasping the plant over an area thereof embracing a crop portion of the plant, lifting and inverting the plant while so grasped, gripping the plant after inversion thereof at a location above the crop portion of the plant, releasing the grasping action, and removing the crop articles from the stem portion of the plant while in inverted position.

2. A process of harvesting fruit and vegetable crops which grow on a bush-type plant, which comprises progressively loosening the plant roots along a row of plants, progressively gently grasping the plants along the row over an area incorporating a portion of the crop thereof, progressively lifting and inverting the plant while so grasped, gripping the plants after inversion thereof at a plant portion free of the crop, and above the crop line of the plant, releasing the grasping action, and carrying the plants along in inverted position while so gripped, combing or stripping the crop articles and leaves from the stems while being carried along in inverted position, and thereafter discharging the stripped root and stem structure.

3. A process of harvesting fruit and vegetable crops which grow on a bush-type plant, which comprises progressively loosening the plant roots along a row of the plants, progressively grasping the plants of the row over a surface of each plant including a crop area of the plant at a speed substantially equal to the speed while loosening the plant roots, progressively lifting and inverting the plants while so grasped, gripping the plant and while so grasped, after inversion thereof above the crop bearing portion thereof, releasing the grasping action, carrying the plants along in inverted position while so gripped at a speed substantially greater than the speed while loosening the plant roots, combing or stripping the crop articles and leaves from the stems while being carried along in inverted position, and thereafter discharging the stripped root and stem structure.

4. A process of harvesting fruit and vegetable crops as recited in claim 1, in which the combing and stripping action is carried out from the tips of the plant progressively toward the stem-root juncture.

5. A process of harvesting lima beans in their pods from a bush-type plant, which comprises grasping an area of the plant including a crop bearing portion thereof, lifting the plant and carrying it upwardly to an inverted position, gripping the plant while so grasped at a plant portion above the crop bearing portion thereof, and combing the pods from the stems of the plants while in inverted position.

6. A process of harvesting fruit and vegetable crops which grow on a bush type plant, which comprises lifting the plant from the ground, inverting the plant to be positioned root uppermost, grasping the plant while inverted at the root portion thereof to place the stems and crop thereon in depending position, combing or stripping the crop and leaves from the stems while inverted, and thereafter separating the crop from the leaves.

7. A method of packing articles such as lima beans in containers, which comprises lifting the plant from the ground in the field, inverting the plant to place the stems and crop thereon in depending position, gripping the plant at a location above the crop bearing portion thereof, combing or stripping the pods and leaves from the stem while inverted, separating the crop from the leaves, holding the crop in the pods for a desired period, thereafter podding the crop, and packing the crop in containers.

8. A method of packing articles such as lima beans in containers, which comprises lifting the plant from the ground in the field by grasping the plant over an area and in a location including a crop bearing portion thereof, to place the stems and crop thereon in depending position, gripping the plant at a location above the crop bearing portion thereof, combing or stripping the pods and leaves from the stem while inverted, separating the crop from the leaves, transporting the crop from the field to the plant, holding the crop in the pods for a desired period, thereafter podding the crop, and packing the crop in containers.

References Cited in the file of this patent

UNITED STATES PATENTS

| | | |
|---|---|---|
| 1,175,419 | Fettig | Mar. 14, 1916 |
| 1,251,425 | Rogers et al. | Dec. 25, 1917 |
| 1,559,501 | Burdick | Oct. 27, 1925 |
| 1,727,020 | Urschel | Sept. 3, 1929 |
| 2,679,716 | Dunkle | June 1, 1954 |
| 2,699,030 | Adamson | Jan. 11, 1955 |